(12) United States Patent
Park

(10) Patent No.: US 9,084,505 B2
(45) Date of Patent: Jul. 21, 2015

(54) ENAMELED-HEATED COOKING UTENSILS WITH NON-STICK CERAMIC COATING LAYER, AND PREPARATION METHOD THEREOF

(76) Inventor: Chung Kwon Park, Busan (KR)

(*) Notice: Subject to any disclaimer, the term of this patent is extended or adjusted under 35 U.S.C. 154(b) by 652 days.

(21) Appl. No.: 13/384,855

(22) PCT Filed: Feb. 5, 2010

(86) PCT No.: PCT/KR2010/000743
§ 371 (c)(1),
(2), (4) Date: Jan. 19, 2012

(87) PCT Pub. No.: WO2011/010780
PCT Pub. Date: Jan. 27, 2011

(65) Prior Publication Data
US 2012/0118168 A1    May 17, 2012

(30) Foreign Application Priority Data
Jul. 23, 2009 (KR) ........................ 10-2009-0067522

(51) Int. Cl.
*A47J 36/02* (2006.01)

(52) U.S. Cl.
CPC ................ *A47J 36/02* (2013.01); *A47J 36/025* (2013.01)

(58) Field of Classification Search
CPC ........ C22C 2204/00; H01B 1/20; H01B 3/12; A47J 27/00; A47J 36/02; A47J 36/04; A47J 36/025; A47J 36/027; C23C 28/00; C23C 28/04; C23C 30/00; Y10T 428/31663
USPC ......... 99/324, 339; 106/31.05, 312, 313, 602, 106/643, 404; 501/14–26; 126/506; 220/592.01, 592.22
See application file for complete search history.

(56) References Cited

U.S. PATENT DOCUMENTS

| | | | | |
|---|---|---|---|---|
| 2,487,119 | A | * | 11/1949 | Fenton ............................ 501/25 |
| 2,697,159 | A | * | 12/1954 | Donahey ....................... 428/386 |
| 3,013,897 | A | * | 12/1961 | Cupery et al. ................ 428/149 |
| 3,580,733 | A | * | 5/1971 | Ott .............................. 26/273 A |

(Continued)

FOREIGN PATENT DOCUMENTS

| | | |
|---|---|---|
| JP | 07-008387 | 1/1995 |
| JP | 10-113290 | 5/1998 |

(Continued)

*Primary Examiner* — Eric Stapleton
(74) *Attorney, Agent, or Firm* — John K. Park; Park Law Firm

(57) ABSTRACT

The present invention relates to enameled-heated cooking utensils with a non-stick ceramic coating layer, and a preparation method thereof, wherein enamel layers are formed on both sides of a main body of heating cooking utensils which is made by using an iron and steel material such as cast ion, steel, cold rolled steel plate and the like, and a non-stick ceramic coating layer which emits anions, radiates far infrared rays, is nonadhesive and does not harm the human body, is formed on the outer surface of the enamel layers. The inventive enameled heating cooking utensils has excellent corrosion resistance, abrasion resistance, heat resistance and the like, prevents food from sticking when heating food, and is environmentally-friendly by forming a non-stick ceramic coating layer which does not harm human body, and thus the demand of the enameled-heated cooking utensils according to the present invention is expected to remarkably increase hereafter.

3 Claims, 2 Drawing Sheets

(56) References Cited

U.S. PATENT DOCUMENTS

| | | | |
|---|---|---|---|
| 3,934,748 A * | 1/1976 | Racz | 99/447 |
| 3,984,604 A * | 10/1976 | King et al. | 428/422 |
| 4,020,046 A * | 4/1977 | King et al. | 525/137 |
| 4,090,993 A * | 5/1978 | Attwood et al. | 524/508 |
| 4,131,711 A * | 12/1978 | Attwood | 428/332 |
| 4,167,605 A * | 9/1979 | Attwood et al. | 428/419 |
| 4,196,004 A * | 4/1980 | Berretz | 501/17 |
| 4,221,824 A * | 9/1980 | Leonard et al. | 427/470 |
| 4,250,215 A * | 2/1981 | Mayer | 206/524.3 |
| RE31,448 E * | 11/1983 | Attwood et al. | 428/422 |
| 4,564,001 A * | 1/1986 | Maeda | 219/621 |
| 4,818,350 A * | 4/1989 | Batzar | 205/188 |
| 4,959,256 A * | 9/1990 | Piera | 428/144 |
| 5,049,437 A * | 9/1991 | Tannenbaum | 428/215 |
| 5,071,695 A * | 12/1991 | Tannenbaum | 428/216 |
| 5,079,073 A * | 1/1992 | Tannenbaum | 428/216 |
| 5,432,007 A * | 7/1995 | Naito | 428/447 |
| 6,001,494 A | 12/1999 | Kuchinski et al. | 428/653 |
| 6,077,341 A | 6/2000 | Terase et al. | 106/482 |
| 6,291,054 B1 | 9/2001 | Thomas et al. | 428/141 |
| 6,372,290 B1 | 4/2002 | Berkenkoetter et al. | 427/255.18 |
| 7,470,453 B1 * | 12/2008 | Lewis et al. | 427/407.1 |
| 7,727,637 B2 * | 6/2010 | Park | 428/472.2 |
| 7,964,294 B2 * | 6/2011 | Venkataramani et al. | 428/697 |
| 2001/0003358 A1 | 6/2001 | Terase et al. | 252/62 |
| 2001/0044019 A1 * | 11/2001 | Huesmann | 428/325 |
| 2003/0021988 A1 * | 1/2003 | Tannenbaum | 428/336 |
| 2003/0059600 A1 * | 3/2003 | Gazo et al. | 428/328 |
| 2004/0112253 A1 * | 6/2004 | Zimmermann et al. | 106/415 |
| 2004/0229044 A1 * | 11/2004 | Goto | 428/421 |
| 2004/0253463 A1 * | 12/2004 | Inui et al. | 428/448 |
| 2005/0003065 A1 * | 1/2005 | Liu | 426/523 |
| 2005/0042463 A1 * | 2/2005 | Anderson et al. | 428/447 |
| 2007/0134488 A1 * | 6/2007 | Hayakawa | 428/323 |
| 2007/0218297 A1 * | 9/2007 | Jeon et al. | 428/447 |
| 2007/0231563 A1 * | 10/2007 | Adams et al. | 428/323 |
| 2007/0232732 A1 * | 10/2007 | Adams et al. | 524/167 |
| 2008/0017074 A1 * | 1/2008 | Park | 106/404 |
| 2008/0237241 A1 * | 10/2008 | Buffard et al. | 220/573.2 |
| 2009/0004434 A1 * | 1/2009 | Parent et al. | 428/148 |
| 2009/0202782 A1 * | 8/2009 | Cardoso et al. | 428/149 |
| 2010/0009177 A1 * | 1/2010 | Venkataramani et al. | 428/336 |
| 2010/0101429 A1 * | 4/2010 | Shigeru et al. | 99/324 |
| 2010/0108351 A1 * | 5/2010 | Pinacci et al. | 174/110 A |
| 2010/0181322 A1 * | 7/2010 | Perillon et al. | 220/573.2 |
| 2011/0111239 A1 * | 5/2011 | Dandekar et al. | 428/469 |
| 2011/0198358 A1 * | 8/2011 | Parent et al. | 220/573.1 |

FOREIGN PATENT DOCUMENTS

| | | |
|---|---|---|
| KR | 10-2002-0080189 | 10/2002 |
| KR | 10-0765382 | 8/2006 |
| KR | 10-0871877 | 11/2008 |

* cited by examiner

ENAMELED-HEATED COOKING UTENSILS WITH NON-STICK CERAMIC COATING LAYER, AND PREPARATION METHOD THEREOF

TECHNICAL FIELD

The present invention relates to an enameled heat-cooker including a non-stick ceramic coating layer, wherein enamel layers are formed on both surfaces of a body of the heat-cooker which is made of an iron and steel material such as cast ion, steel, and the like, and a non-stick ceramic coating layer which emits anions, radiates far infrared rays, is non-adhesive, and is non-toxic to the human body, is formed on the outer surface of one of the enamel layers, so that the heat-cooker is excellent in corrosion resistance, abrasion resistance, heat resistance, and the like, and prevents food from sticking thereto when heating food, and a method for manufacturing the same.

BACKGROUND ART

In general, a heat-cooker such as a cavity assembly of frying pans, saucepans, woks, gas oven ranges, or microwave ranges to which high-temperature heat is transmitted is manufactured using an aluminum or stainless steel material. Also, the surface treatment is performed on the heat-cooker using various methods to improve the physico-chemical properties such as durability, heat resistance, and the like of such a material. For an iron and steel material, an enamel coating is mainly performed, but it typically does not have a non-stick function and thus food sticks to a cooking surface of the heat-cooker during cooking, which leads to an great increase in dissatisfaction of consumers. Therefore, the improvement of the heat-cooker is required urgently.

As a solution to address and solve the problems involved in the heat-cooker having a body made of an iron and steel material, Korean Utility Model Registration No. 202236 discloses an enameled heat-cooker including a polytetrafluoroethylene (PTFE) coating layer in which an enamel layer 30 is formed on the entire main surface of a body 10, and a polytetrafluoroethylene (PTFE) coating layer 40 is formed on one surface of the body as shown in FIG. 1. In addition, Korean Patent Registration No. 394045 discloses a heat-cooker in which a coating treatment is performed on the inner and outer surfaces of a body 10 made of an iron or aluminum material, an enamel layer 30 is formed on the outer surface of the body, followed by hot drying, a fine corrugated pattern is formed on the entire inner surface of the body 10 and a thermal spray coating is performed thereon, and a polytetrafluoroethylene (PTFE) layer 40 is coated in a multiple stack manner on the inner surface of the body 10, followed by hot drying as shown in FIG. 2.

However, for the above heat-cooker, as a non-stick ceramic coating layer made of a polytetrafluoroethylene (PTFE) resin is formed on the body of the heat-cooker, a surfactant called PFOA (Perfluorooctanioc acid) as a catalyst recently used in the preparation process of a fluorine resin such as polytetrafluoroethylene (PTFE) may threaten the health of pregnant women or young girls at childbearing ages according to an internal report of the U.S. Environmental Protection Agency (EPA). In addition, the conventional heat-cooker entails problems in that even if polytetrafluoroethylene (PTFE) as a coating material is heated up to 260° C., a polytetrafluoroethylene (PTFE) coating layer is decomposed, and thus food may adhere to the cooking surface of the heat-cooker when it is used for a long period of time or is used at high temperature.

Meanwhile, the present inventor has developed various techniques for the surface treatment of a body of the heat-cooker made of an iron and steel material in view of the above-mentioned problems, and Korean Patent Registration No. 512599 disclosing an anion-radiating and far infrared ray-emitting inorganic ceramic coating composition has been registered, and Korean Patent Registration No. 765382 disclosing a structure of coating layer for heat-cooker has been registered, and Korean Patent Registration No. 871877 disclosing a ceramic coating metal heat-cooker and a manufacturing method thereof, which is an improvement of the above patents, has been registered.

Therefore, the present inventor has manufactured a non-stick enameled heat-cooker in which an enamel layer is coated on the outer surfaces of a body made of an iron and steel material, and then a non-stick ceramic coating layer is formed on the enamel layer by employing the ceramic coating technique applied to the above patents, thus completing the present invention.

DISCLOSURE OF INVENTION

Technical Problem

Accordingly, the present invention has been made in order to solve the above-described problems occurring in the prior art, and it is an object of the present invention is to provide an enameled heat-cooker including a non-stick ceramic coating layer, wherein enamel layers are formed on both surfaces of a body of the heat-cooker which is made of an iron and steel material such as cast ion, steel, cold rolled steel plate, and the like, and a non-stick ceramic coating layer which emits anions, radiates far infrared rays, is non-adhesive, and is non-toxic to the human body, is formed on the outer surface of one of the enamel layers, so that the heat-cooker is excellent in corrosion resistance, abrasion resistance, heat resistance, and the like, and prevents food from sticking thereto when heating food.

Another object of the present invention is to provide a method for manufacturing an enameled heat-cooker including a non-stick ceramic coating layer, the method comprising the steps of: forming enamel layers on a body made of an iron and steel material; performing sandblasting on the outer surface of one of the enamel layers or forming an enamel layer containing silica fine particles on the outer surface of the enamel layer to increase surface roughness of the enamel layer; and forming a non-stick ceramic coating layer on the outer surface of the enamel layer to enhance the adhesive force between the enamel layers and the non-stick ceramic coating layer.

Technical Solution

To achieve the above objects, in one aspect, the present invention provides an enameled heat-cooker including a non-stick ceramic coating layer, comprising: a body 10 made of an iron and steel material; and a lower enamel layer 31 and an upper enamel layer 32, which are formed on both surfaces of the body, respectively, wherein the upper enamel layer 32 comprises a non-stick ceramic coating layer 40 formed on the outer surface thereof.

In another aspect, the present invention also provides an enameled heat-cooker including a non-stick ceramic coating layer, comprising: a body 10 made of an iron and steel material; and a lower enamel layer 31 and an upper enamel layer 32, which are formed on both surfaces of the body, respectively, wherein the upper enamel layer 32 comprises a first enamel layer 32a and a second enamel layer 32b which are formed in a stack manner, and wherein the second enamel layer 32b of the upper enamel layer comprises a non-stick ceramic coating layer 40 formed on the outer surface thereof.

In still another aspect, the present invention also provides a method for manufacturing an enameled heat-cooker including said non-stick ceramic coating layer.

In the present invention, a glaze used in the lower and upper enamel layers 31 and 32 preferably consists of: 70-80 wt % of a mixture comprising 16-42 parts by weight of siliceous stone, 10-32 parts by weight of feldspar, 20-30 parts by weight of borax, 9-15 parts by weight of soda ash, 3-7 parts by weight of fluorite, 3-5 parts by weight of sodium acetate, 0.3-0.5 parts by weight of nickel oxide, and 0.4-0.6 parts by weight of cobalt oxide; and 20-30 wt % of water.

In the present invention, a glaze used in the second enamel layer 32b of the upper enamel layer consists of: 70-80 wt % of a mixture comprising 16-42 parts by weight of siliceous stone, 10-32 parts by weight of feldspar, 20-30 parts by weight of borax, 9-15 parts by weight of soda ash, 3-7 parts by weight of fluorite, 3-5 parts by weight of sodium acetate, 0.3-0.5 parts by weight of nickel oxide, 0.4-0.6 parts by weight of cobalt oxide, and 15-25 parts by weight of activated carbon; and 20-30 wt % of water.

In addition, in the present invention, a non-stick ceramic coating agent used to form the non-stick ceramic coating layer 40 comprises a ceramic coating composition which comprises 65-83 parts by weight of an inorganic binding agent consisting essentially of 50-70 wt % of a silane compound and 30-50 wt % of a silica sol, 10-19 parts by weight of a functional filler, 5-15 parts by weight of a ceramic powder in which a far infrared ray-radiating material and an anion-emitting material are mixed at a weight ratio of 1:1, and 1-2 parts by weight of a pigment, based on 100 parts by weight of the ceramic coating composition.

Advantageous Effects

According to a method for manufacturing the enameled heat-cooker of the present invention, enamel layers are formed on a body made of an iron and steel material such as cast ion, steel, cold rolled steel plate, and the like, sandblasting is performed on the outer surface of one of the enamel layers or an enamel layer containing silica fine particles is formed on the outer surface of the enamel layer to increase surface roughness of the enamel layer, a non-stick ceramic coating layer is formed on the outer surface of the enamel layer to enhance the adhesive force between the enamel layers and the non-stick ceramic coating layer. The enameled heat-cooker according to the present invention is excellent in corrosion resistance, abrasion resistance, heat resistance, and the like, prevents food from sticking thereto when heating food, and is environmentally-friendly by forming a ceramic coating layer which is non-toxic to the human body unlike polytetrafluoroethylene (PTFE) recently used as a non-stick coating agent, as a non-stick layer, and thus the demand of the enameled heat-cooker according to the present invention is expected to remarkably increase in future.

BEST MODE FOR CARRYING OUT THE INVENTION

Hereinafter, an enameled heat-cooker including a non-stick ceramic coating layer (hereinafter, referred to as 'heat-cooker') according to a preferred embodiment of the present invention will be described in further detail with reference to FIGS. 3 and 4. In the meantime, in the detailed description and the accompanying drawings, illustration and explanation on the construction and operation which a person skilled in the art can easily understand from a general heat-cooker will be briefly made or will be omitted to avoid redundancy.

Figure 1:
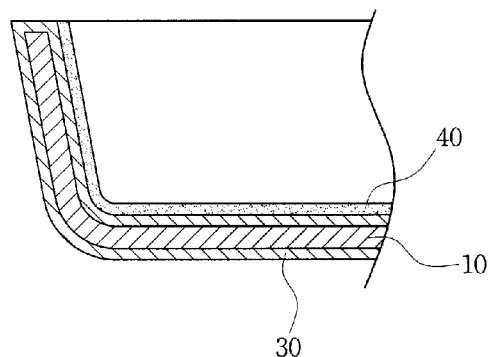
FIG. 1 is a cross-sectional view illustrating a conventional enameled heat-cooker having a polytetrafluoroethylene (PTFE) coating layer formed on a cooking surface thereof.
Figure 2:
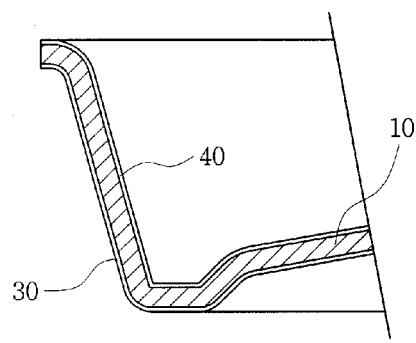
FIG. 2 is a cross-sectional view illustrating another conventional enameled heat-cooker having a polytetrafluoroethylene (PTFE) coating layer formed on a cooking surface thereof.
Figure 3:
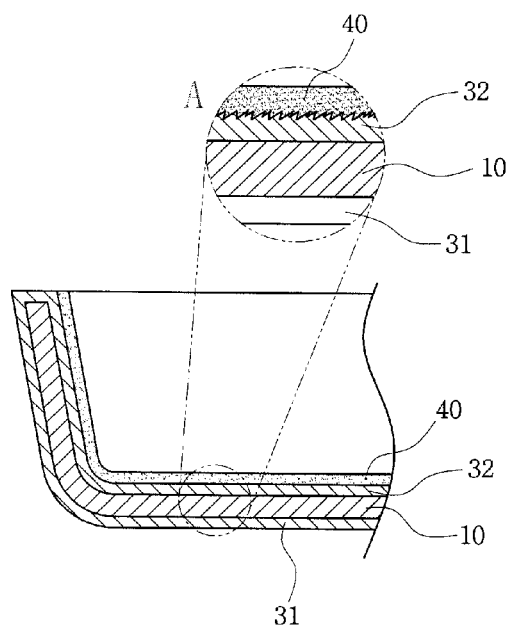
FIG. 3 is a cross-sectional view illustrating an enameled heat-cooker having a non-stick ceramic coating layer formed on a cooking surface thereof according to one embodiment of the present invention.
Figure 4:
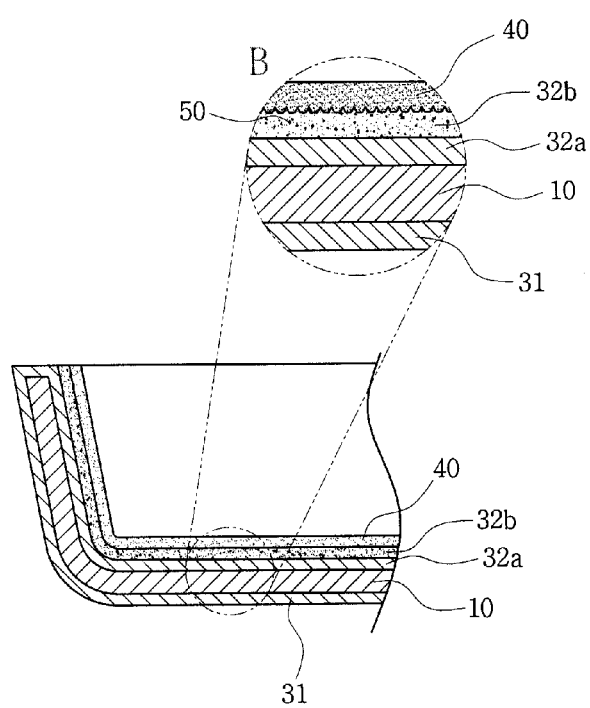
FIG. 4 is a cross-sectional view illustrating an enameled heat-cooker having an upper first enamel layer, an upper second enamel layer, and a non-stick ceramic coating layer sequentially formed in a stack manner on a cooking surface of the heat cooker according to another embodiment of the present invention.

FIG. 3 is a cross-sectional view illustrating an enameled heat-cooker having a non-stick ceramic coating layer formed on a cooking surface thereof according to one embodiment of the present invention, and FIG. 4 is a cross-sectional view illustrating an enameled heat-cooker having an upper first enamel layer, an upper second enamel layer, and a non-stick ceramic coating layer sequentially formed in a stack manner on a cooking surface of the heat cooker according to another embodiment of the present invention.

The heat-cooker according to the present invention will be described hereinafter in detail with reference to FIGS. 3 and 4.

First, referring to FIG. 3, the heat-cooker according to the present invention includes a body 10 made of an iron and steel material and a lower enamel layer 31 and an upper enamel layer 32, which are formed on both surfaces of the body, respectively. The upper enamel layer 32 includes a non-stick ceramic coating layer 40 formed on the outer surface thereof.

The heat-cooker allows sandblasting to be performed on the outer surface of the upper enamel layer 32 to increase surface roughness, thereby improving the adhesive force between the upper enamel layer 32 and the non-stick ceramic coating layer 40.

In addition, referring to FIG. 4, the heat-cooker according to the present invention includes a body 10 made of an iron and steel material, and a lower enamel layer 31 and an upper enamel layer 32, which are formed on both surfaces of the body, respectively. The upper enamel layer 32 includes a first enamel layer 32a and a second enamel layer 32b which are formed in a stack manner, and the second enamel layer 32b of the upper enamel layer comprises a non-stick ceramic coating layer 40 formed on the outer surface thereof.

In the heat-cooker of the resent invention, if an activated carbon 50 having a 50-100 mesh particle size is added to the components of a glaze used to form the lower enamel layer and the first enamel layer of the upper enamel layer to obtain a resultant glaze composition such that the second enamel layer 32b is coated with the glaze composition, the surface roughness of the second enamel layer 32b is increased by the particles of the activated carbon 50 dispersed in the second enamel layer to enhance the adhesive force between the upper enamel layer 32 and the non-stick ceramic coating layer 40.

The heat-cooker according to the present invention uses a material of the body 10 as an iron and steel material such as cast ion, steel, cold rolled steel plate, and the like. Such as iron and steel material is inexpensive but is vulnerable to corrosion, and thus requires the surface treatment.

In addition, the body 10 made of an iron and steel material includes porcelain enamel layers 31 and 32 formed on the outer surfaces thereof to improve corrosion resistance and abrasion resistance of the body 10.

In the present invention, the enamel layers 31 and 32 are coated with a glaze. The enamel-coated layers are formed by applying a porcelain film on the surface of a metal material such as an iron and steel material. In this case, a glaze used to form the enamel-coated layers consists of a mixture of a ceramic material and a glass material, which exhibits alkalescence, and thus suppresses the corrosion of the metal and allows the enamel layer to well adhere to the metal. Then, the mixture is dried and then is placed into a calcination kiln where it is heated and melted at 900° C. or more into a liquid so as to be coated on the enamel layers.

In the present invention, the glaze used in the enamel layers 31 and 32 preferably consists of 70-80 wt % of a mixture comprising 16-42 parts by weight of siliceous stone, 10-32 parts by weight of feldspar, 20-30 parts by weight of borax, 9-15 parts by weight of soda ash, 3-7 parts by weight of fluorite, 3-5 parts by weight of sodium acetate, 0.3-0.5 parts by weight of nickel oxide, and 0.4-0.6 parts by weight of cobalt oxide, and 20-30 wt % of water. The raw materials of the glaze are the components of a glaze commonly used in coating the enamel. The raw materials of the glaze are the components of a composition that a person of ordinary skill in the art can easily understand, and thus the detailed description thereof will be omitted to avoid redundancy.

The glaze used in the second enamel layer 32b is preferably obtained by adding 15-25 parts by weight of an activated carbon 50 to said components of the glaze mixture.

In the present invention, the raw materials such as siliceous stone, feldspar, borax, and the like used in the glaze preferably have a particle size of 200-300 meshes. The activated carbon 50 used in the second enamel layer 32b preferably has a 50-100 mesh particle size.

In the present invention, each of the enamel layers 31 and 32 preferably has the same thickness of 100-250 μm as that of an enamel layer coated on a general enameled heat-cooker in consideration of heat conductivity, corrosion resistance, abrasion resistance, and the like. Although the sum of the thicknesses of the first enamel layer 32a and the second enamel layer 32b is preferably in the range of 100-250 μm, the thicknesses of the enamel layers may be properly controlled depending on the demand of consumers or the need of manufacturers, but not always limited thereto.

In addition, the heat-cooker according to the present invention is a heat-cooker such as an assembly (i.e., tray, cavity assembly, or the like) of a frying pan, a saucepan, a wok, a gas oven range, or a microwave rang, which is configured to have a non-stick ceramic coating layer 40 which emits anions and far infrared rays, and is non-toxic to the human body, formed on the outer surface of the enamel layer 32 or 32b to prevent food from sticking thereto when heating food.

A conventional heat-cooker has a problem in that a polytetrafluoroethylene (PTFE) resin used as a non-stick coating agent is a point in dispute as discussed in the background art section of this specification and the PTEFE coating layer is known for being decomposed at 260° C. or more. On the other hand, the present invention features that the non-stick ceramic coating layer 40 is formed such that the present invention is not harmful to the human body and a non-stick ceramic coating layer is not decomposed even when cooking at high temperature, thereby enhancing durability.

A non-stick ceramic coating composition used in the present invention is a composition disclosed in a prior patent of the present inventor which has been registered. The non-stick ceramic coating composition uses a ceramic coating composition which comprises 65-83 parts by weight of an inorganic binding agent consisting essentially of 50-70 wt % of a silane compound and 30-50 wt % of a silica sol, 10-19 parts by weight of a functional filler, 5-15 parts by weight of a ceramic powder in which a far infrared ray-radiating material and an anion-emitting material are mixed at a weight ratio of 1:1, and 1-2 parts by weight of a pigment, based on 100 parts by weight of the ceramic coating composition.

In addition, the silane compound preferably is at least one selected from the group consisting of methyltrimethoxysilane, ethyltrimethoxysilane, normalpropyltrimethoxysilane, phenyltrimethoxysilane, vinyltrimethoxysilane, methyltrimethoxysilane, ethyltriethoxysilane, normalpropyltriethoxysilane, phenyltrimethoxysilane, vinyltriethoxysilane, trifluoropropyltrimethoxysilane, tridecafluorooctyltrimethoxysilane, tetraethoxysilane, and heptadecafluorodecyltrimethoxysilane.

Moreover, the silica sol is obtained by mixing 60 to 80% by weight of water and 20 to 40% by weight of a powder silicon oxide ($SiO_2$) having a particle size of from 0.2 to 1.0 μm, based on the total weight of the silica sol.

Further, the far infrared ray-radiating material preferably is at least one selected from the group consisting of tourmaline, yellow ochre, sericite, amethyst, bamboo charcoal, obsidian, elvan, and lava, and the anion-emitting material preferably is at least one selected from the group consisting of strontium, vanadium, zirconium (or zirconia), cerium, neodymium, lanthanum, barium, rubidium, cesium, and gallium. The far infrared ray-radiating material and the anion-emitting material preferably have a particle size of 200-300 meshes.

Preferably, the functional filler uses potassium titanate or alumina to enhance the physico-chemical properties such as durability, corrosion resistance, and abrasion resistance, or at least one selected from a group of natural mineral materials such as quartz, monzonite, gneiss, rhyolitic tuff, seaweed charcoal, and hard wood charcoal. The functional filler preferably preferably has a particle size of 200-300 meshes.

In the present invention, the non-stick ceramic coating layer 40 preferably has a thickness of 20-50 μm. If the thickness of the non-stick ceramic coating layer is less than 20 μm, then this may lead to a reduction in the mechanical properties such as durability, abrasion resistance, and the chemical properties such as corrosion resistance. On the contrary, if the thickness of the non-stick ceramic coating layer exceeds 50 μm, then the mechanical and chemical properties are improved but this may lead to a reduction in heat conductivity.

In the present invention, the non-stick ceramic coating composition is in detail disclosed in Korean Patent Registration No. 871877 of the present inventor, which has been registered, and thus the detained description thereof will be omitted.

Hereinafter, a method for manufacturing the heat-cooker according to the present invention will be described in detail.

First, the heat-cooker having the structure according to the present invention as shown in FIG. 3 is manufactured by forming a lower enamel layer 31 and an upper enamel layer 32 on both surfaces of a body 10 made of an iron and steel material, respectively, performing sandblasting on the outer surface of the upper enamel layer 32 to increase surface roughness, and forming a non-stick ceramic coating layer 40 on the sandblasted outer surface of the upper enamel layer.

The compositions of the glaze and the non-stick ceramic coating agent according to the present invention have been described above, and thus only the process conditions according to the manufacturing method of the heat-cooker will be described.

In the present invention, the enamel layers are formed such that a glaze is applied on the surface of a body of the heat-cooker made of an iron and steel material, which is cleanly pre-treated using nitric acid, sulfuric acid, or the like, and the heat-cooker is charged into a calcination kiln. Then, the heat-cooker is pre-dried at 90-110° C. for 10-30 minutes, and then hot-dried at 820-950° C. for 1-2 hours to form the enamel layers as porcelain layers into a thickness of 100-250 μm, followed by slow cooling.

If the values of the process condition required for forming the enamel layers are less than the above lower limits then the enamel layers of the surfaces of the body made of an iron and steel material may not be cured smoothly. On the contrary, if the values of the process condition required for forming the enamel layers exceed the above upper limits, then a bubble phenomenon may occur on the enamel layers due to high temperature or a non-economic process may be carried out due to the excessive use of energy.

In addition, in the preset invention, sandblasting is performed on the outer surface of the upper enamel layer 32 to increase the surface roughness of the upper enamel layer such that the adhesive force between the upper enamel layer 32 and the non-stick ceramic coating layer 40 is enhanced as shown in an enlarged portion A of FIG. 3. In this case, it is required that the surface of the upper enamel layer should be removed only partially to reduce the thickness thereof.

The sandblasting is preferably performed by spraying steel balls each having a 60-200 mesh particle size onto on the outer surface of the upper enamel layer at a pressure of 3-7 kg/cm$^2$ for 5-20 seconds.

If the particle size of the steel ball exceeds 200 meshes, then particles less than 200 meshes of the particles forming the upper enamel layer 32 may be not removed. On the other hand, if the particle size of the steel ball is less than 60 meshes, then the upper enamel layer 32 may be removed in its entirety. In addition, if the sandblasting time or the sandblasting pressure exceeds the above upper limit, then the upper enamel layer may be removed in its entirety. Contrarily, if the sandblasting time or the sandblasting pressure is exceeds the above lower limit, then a part of the upper enamel layer 32 may not be removed well.

In addition, preferably, the outer surface of the upper enamel layer 32 is subjected to sandblasting to increase the surface roughness, and then the non-stick ceramic coating layer 40 is formed into a thickness of 20-50 μm using a non-stick ceramic coating agent, followed by slow cooling.

The non-stick ceramic coating layer 40 is preferably calcinated within the time range of 1-2 hours. If the calcinations time is less than the above lower limit, then this may lead to a reduction in the bonding force between the binding agent and the ceramic powder. On the contrary, if the calcinations time exceeds the above upper limit, then this may lead to a reduction in the physical properties.

In addition, the heat-cooker having the structure according to the present invention as shown in FIG. 4 is manufactured by forming a lower enamel layer 31 and an upper first enamel layer 32a on both surfaces of a body 10 made of an iron and steel material, respectively, forming an upper second enamel layer 32b on the outer surface of the upper first enamel layer 32a using a glaze containing an activated carbon to increase surface roughness as shown in an enlarged portion B of FIG. 4, and forming a non-stick ceramic coating layer 40 on the outer surface of the upper second enamel layer 32b.

As shown in FIG. 4, in the heat-cooker including the upper first enamel layer 32a and the upper second enamel layer 32b, the upper second enamel layer 32b is formed using a glaze obtained by adding 15-25 parts by weight of an activated carbon having a particle size of 50-100 meshes to the glaze consisting of raw materials each having a particle size of 200-300 meshes used in the upper first enamel layer 32 to increase the surface roughness by the activated carbon which is not melted in the formation of the upper second enamel layer 32b such that the adhesive force between the upper second enamel layer 32b and the non-stick ceramic coating layer 40 can be enhanced.

In addition, as shown in FIG. 4, in the manufacture of the heat-cooker including the first enamel layer 32a and the second enamel layer 32b, the lower enamel layer 31, the first enamel layer 32a, and the non-stick ceramic coating layer 40 is formed in the same method as the manufacturing method of the heat-cooker as shown in FIG. 3 except the method of forming the second enamel layer 32b.

In the present invention, the non-stick ceramic coating layer 40 formed on the outer surface of the upper enamel layer or the upper second enamel layer may be coated by various methods such as spray-coating, dipping, brushing, roll coating, electrostatic coating, and the like.

The heat-cooker according to the present invention manufactured by the above-mentioned method features that enamel layers are formed on the outer surfaces of a body made of an iron and steel material, and a non-stick ceramic coating layer is formed on the outer surface of the inner enamel layer as a cooking surface such that the heat-cooker is excellent in corrosion resistance, abrasion resistance, heat resistance, and the like, prevents food from sticking thereto when heating food, and is environmentally-friendly by forming a ceramic coating layer which is non-toxic to the human body unlike polytetrafluoroethylene (PTFE) recently used as a non-stick coating agent, as a non-stick layer.

Now, the present invention will be described in more detail by way of examples. It should be appreciated that the scope of the invention is not limited by only the examples.

1. Manufacture of Enameled Heat-Cooker Including Non-Stick Ceramic Coating Layer Example 1

The surfaces of a body of the heat-cooker made of an iron and steel material and having a thickness of 2 mm were cleanly pre-treated using sulfuric acid, and then a glaze was applied thereon. Thereafter, the heat-cooker was charged into a calcination kiln. Then, the heat-cooker was pre-dried at 90° C. for 30 minutes, and then hot-dried at 820° C. for 2 hours to form a lower enamel layer and an upper enamel layer having the structure as shown in FIG. 3 into a thickness of 150±30 μm, followed by slow cooling to room temperature.

Subsequently, the sandblasting was performed by spraying steel balls each having a 60-80 mesh particle size onto on the outer surface of the upper enamel layer at a pressure of 3 kg/cm$^2$ for 20 seconds to increase the surface roughness of the outer surface of the upper enamel layer. Thereafter, a non-stick ceramic coating agent was applied on the sandblasted outer surface of the upper enamel layer and was calcinated at 160° C. for 2 hours to form a non-stick ceramic coating layer into a thickness of 40±10 μm on the outer surface of the upper enamel layer. Thus, a heat-cooker formed with the non-stick ceramic coating layer and a test piece were manufactured.

The gaze used in Example 1 was a glaze which consists of: 70 wt % of a mixture comprising 16 parts by weight of siliceous stone, 32 parts by weight of feldspar, 26.1 parts by weight of borax, 15 parts by weight of soda ash, 5 parts by weight of fluorite, 5 parts by weight of sodium acetate, 0.3 parts by weight of nickel oxide, and 0.6 parts by weight of cobalt oxide; and 30 wt % of water.

In the glaze used in this Example 1, each of the raw materials such as siliceous stone, feldspar, borax, and the like had a particle size of 200-300 meshes.

In addition, the non-stick ceramic coating agent was coated with a ceramic coating composition which comprises 72 parts by weight of an inorganic binding agent, 15 parts by weight of a functional filler, 12 parts by weight of a ceramic powder, and 1 part by weight of a pigment, based on 100 parts by weight of the ceramic coating composition.

Example 2

The surfaces of a body of the heat-cooker made of an iron and steel material and having a thickness of 2 mm were cleanly pre-treated using sulfuric acid, and then a glaze was applied thereon. Thereafter, the heat-cooker was charged into a calcination kiln. Then, the heat-cooker was pre-dried at 100° C. for 10 minutes, and then hot-dried at 950° C. for 1 hour to form a lower enamel layer and an upper first enamel layer having the structure as shown in FIG. 4 into a thickness of 100±30 μm, followed by slow cooling to room temperature.

Subsequently, the outer surface of the upper first enamel layer was made rough by an activated carbon in the same method as in the above to form an upper second enamel layer thereon into a thickness of 100±20 μm using a glaze containing the activated carbon, followed by slow cooling to room temperature.

Thereafter, a non-stick ceramic coating agent was applied on the outer surface of the upper second enamel layer which was made rough and was calcinated at 300° C. for 2 hours to form a non-stick ceramic coating layer into a thickness of 40±10 μm on the outer surface of the upper second enamel layer. Thus, a heat-cooker formed with the non-stick ceramic coating layer and a test piece were manufactured.

The glaze used to form the lower enamel layer and the upper first enamel layer used a glaze having the same composition as that of the glaze used in Example 1.

The gaze used in the upper second enamel layer was a glaze which consists of: 80 wt % of a mixture comprising 32 parts by weight of siliceous stone, 10 parts by weight of feldspar, 22 parts by weight of borax, 9 parts by weight of soda ash, 6.3 parts by weight of fluorite, 5 parts by weight of sodium acetate, 0.3 parts by weight of nickel oxide, 0.4 parts by weight of cobalt oxide, and 15 parts by weight of an activated carbon; and 20 wt % of water.

In this Example 2, in the glaze used in the lower enamel layer and the upper first enamel layer, each of the raw materials such as siliceous stone, feldspar, borax, and the like had a particle size of 200-300 meshes, and the activated carbon used in the upper second enamel layer had a particle size of 50-100 meshes.

In addition, the non-stick ceramic coating agent used a non-stick ceramic coating agent having the same composition as those in the above Example 1.

Comparative Example 1

Enamel layers were formed on the outer surfaces of a body of a heat-cooker made of an iron and steel material using the glaze having the same composition by the same method as in Example 1 in such a manner that sandblasting was not performed on the outer surface of the upper enamel layer, and a non-stick ceramic coating agent having the same composition as in Example 1 was applied on the outer surface of the upper enamel layer and to form a non-stick ceramic coating layer on the outer surface of the upper enamel layer.

Comparative Example 2

A lower enamel layer and an upper first enamel layer were formed on the outer surfaces of a body of a heat-cooker made of an iron and steel material using the glaze having the same composition by the same method as in Example 1, and an upper second enamel layer was formed on the outer surface of the upper first enamel layer using a glaze containing an activated carbon and having the same composition as in Example 1. Thereafter, a non-stick ceramic coating agent having the same composition as in Example 1 was applied on the outer surface of the upper second enamel layer to form a non-stick ceramic coating layer on the outer surface of the upper second enamel layer.

In this Comparative Example 2, in the glaze used in the lower enamel layer and the upper first enamel layer, each of the raw materials such as siliceous stone, feldspar, borax, and the like had a particle size of 200-300 meshes, and the activated carbon used in the upper second enamel layer had a particle size of 150-200 meshes.

2. Evaluation of Enameled Heat-Cooker Including Non-Stick Ceramic Coating Layer

An evaluation was made on the heat-cooker manufactured by the method of Examples 1 and 2, and Comparative Examples 1 and 2 in terms of impact resistance. A result of the evaluation shows that a crack or delamination was hardly found on the ceramic coating layer of the heat-cooker manufactured by the method of Examples 1 and 2 whereas a micro-crack and delamination was found on the ceramic coating layer of the heat-cooker manufactured by the method of Comparative Examples 1 and 2. This is determined to be caused by the facts that because the sandblasting was not performed on the outer surface of the upper enamel layer, the non-stick ceramic coating layer was formed on the outer surface of the upper enamel layer having a low surface roughness in Comparative Example 1, or that because the activated carbon having a particle size of 150-200 meshes contained in the glaze used in the upper second enamel layer is similar in particle size to the raw materials of the glaze having a particle size of 200-300 meshes, the non-stick ceramic coating layer was formed on the outer surface of the upper enamel layer having a low surface roughness in Comparative Example 2 such that the adhesive force between the upper second enamel layer and the non-stick ceramic coating layer is reduced. The impact resistance test was carried out and examined in such a manner that steel balls of a weight of 200±1 g were allowed to be dropped from a height of 25 cm above the ground on the outer surface of a body of a heat-cooker made of an iron and steel material, and then the coating film of the non-stick ceramic coating layer of the heat-cooker was observed by the naked eye according to the KS D 6711 method.

In addition, an evaluation was made on the heat-cooker manufactured by the method of Examples 1 and 2, and Comparative Examples 1 and 2 in terms of heat resistance. A result of the evaluation shows that a crack was hardly found on the ceramic coating layer of the heat-cooker manufactured by the method of Examples 1 and 2 whereas a micro-crack was found on the ceramic coating layer of the heat-cooker manufactured by the method of Comparative Examples 1 and 2. This is determined to occur by the same reason as in the impact resistance test.

The heat resistance test was carried out and examined in such a manner that the heat-cooker was heated at 250° C. for 24 hours, and then the coating film of the non-stick ceramic coating layer of the heat-cooker was observed according to the KS D 6711 method.

Besides, an evaluation was made on the heat-cooker manufactured by the method of Examples 1 and 2, and Comparative Examples 1 and 2 in terms of corrosion resistance. A result of the evaluation shows that a corrosion was hardly found on the non-stick ceramic coating layer of the heat-cooker manufactured by the method of Examples 1 and 2 whereas because the ceramic coating layer of the heat-cooker manufactured by the method of Comparative Examples 1 and 2 may be damaged due to a reduction in the impact resistance and the heat resistance, the heat cooker always entails a drawback in that it is vulnerable to corrosion. The corrosion resistance test was carried out and examined in such a manner that the heat-cooker was immersed in a 5% $H_2SO_4$ solution for 720 hours, and then the coating films of the enamel layer and the non-stick ceramic coating layer of the heat-cooker were observed after being taken out of the solution according to the JIS K 5400 method.

While the enameled heat-cooker including a non-stick ceramic coating layer and a method for manufacturing the heat-cooker according to the preferred embodiments of the present invention have been described, it will be readily appreciated by those skilled in the art that it is merely illustrative of the preferred embodiments of the present invention and various modifications and changes can be made thereto within the technical spirit and scope of the present invention.

BEST MODE

According to one aspect, the present invention provides an enameled heat-cooker including a non-stick ceramic coating layer and a method for manufacturing the heat-cooker. The enameled heat-cooker includes: a body made of an iron and steel material; and a lower enamel layer and an upper enamel layer, which are formed on both surfaces of the body, respectively, wherein the upper enamel layer comprises a non-stick ceramic coating layer formed on the outer surface thereof.

According to another aspect, the present invention provides an enameled heat-cooker including a non-stick ceramic coating layer and a method for manufacturing the heat-cooker. The enameled heat-cooker includes: a body made of an iron and steel material; and a lower enamel layer and an upper enamel layer, which are formed on both surfaces of the body, respectively, wherein the upper enamel layer comprises a first enamel layer and a second enamel layer which are formed in a stack manner, and wherein the second enamel layer of the upper enamel layer comprises a non-stick ceramic coating layer formed on the outer surface thereof.

INDUSTRIAL APPLICABILITY

The enameled heat-cooker according to the present invention is excellent in corrosion resistance, abrasion resistance, heat resistance, and the like, prevents food from sticking thereto when heating food, and is environmentally-friendly by forming a ceramic coating layer which is non-toxic to the human body unlike polytetrafluoroethylene (PTFE) recently used as a non-stick coating agent, as a non-stick layer, such that the demand of the enameled heat-cooker according to the present invention is expected to remarkably increase in future.

The invention claimed is:

1. An enameled heat-cooker, comprising:
a body made of steel material; and
a lower enamel layer and an upper enamel layer, which are formed on the body,
wherein the upper enamel layer comprises a first enamel layer and a second enamel layer which are formed in a stack manner, and
wherein the second enamel layer of the upper enamel layer comprises a non-stick ceramic coating layer formed on an outer surface thereof,
wherein the lower enamel layer and the first enamel layer of the upper enamel layer are coated with a glaze which consists of: 70-80 wt % of a mixture comprising 16-42 parts by weight of siliceous stone, 10-32 parts by weight of feldspar, 20-30 parts by weight of borax, 9-15 parts by weight of soda ash, 3-7 parts by weight of fluorite, 3-5 parts by weight of sodium acetate, 0.3-0.5 parts by weight of nickel oxide, and 0.4-0.6 parts by weight of cobalt oxide; and 20-30 wt % of water, and
the second enamel layer of the upper enamel layer is coated with a glaze which consists of: 70-80 wt % of a mixture comprising 16-42 parts by weight of siliceous stone, 10-32 parts by weight of feldspar, 20-30 parts by weight of borax, 9-15 parts by weight of soda ash, 3-7 parts by weight of fluorite, 3-5 parts by weight of sodium acetate, 0.3-0.5 parts by weight of nickel oxide, 0.4-0.6 parts by weight of cobalt oxide, and 15-25 parts by weight of activated carbon; and 20-30 wt % of water,
wherein the non-stick ceramic coating layer is coated with a ceramic coating composition which comprises 65-83 parts by weight of an inorganic binding agent consisting essentially of 50-70 wt % of a silane compound and 30-50 wt % of a silica sol, 10-19 parts by weight of a functional filler, 5-15 parts by weight of a ceramic powder in which a far infrared ray-radiating material and an anion-emitting material are mixed at a weight ratio of 1:1, and 1-2 parts by weight of a pigment, based on 100 parts by weight of the ceramic coating composition.

2. The enameled heat-cooker of claim 1, wherein the silica sol is obtained by mixing 60 to 80% by weight of water and 20 to 40% by weight of a powder silicon oxide ($SiO_2$) having a particle size of from 0.2 to 1.0 μm, based on the total weight of the silica sol.

3. The enameled heat-cooker of claim 1, wherein the far infrared ray-radiating material is at least one selected from the group consisting of tourmaline, yellow ochre, sericite, amethyst, bamboo charcoal, and obsidian, and
the anion-emitting material is at least one selected from the group consisting of strontium, vanadium, zirconium (or zirconia), cerium, neodymium, lanthanum, barium, rubidium, cesium, and gallium.

* * * * *